//Oct. 12, 1971  R. W. ROBERTS  3,611,587
RESPONSE MECHANISM FOR AUDIOVISUAL EDUCATIONAL APPARATUS
Filed April 7, 1970  2 Sheets-Sheet 1

INVENTOR.
Richard W. Roberts
BY
ATTORNEY

INVENTOR.
Richard W. Roberts
BY
H. Lawrence Smith
ATTORNEY

United States Patent Office 3,611,587
Patented Oct. 12, 1971

3,611,587
RESPONSE MECHANISM FOR AUDIOVISUAL EDUCATIONAL APPARATUS
Richard W. Roberts, Lombard, Ill., assignor to Borg-Warner Corporation, Chicago, Ill.
Filed Apr. 7, 1970, Ser. No. 26,381
Int. Cl. G09b 3/00
U.S. Cl. 35—8 A                                    1 Claim

ABSTRACT OF THE DISCLOSURE

A manually actuable response mechanism for an audiovisual educational apparatus which permits an operator to respond selectively to audio and visual information presented by depressing one of a number of response keys, thereby initiating a further presentation of audio and visual information. The mechanism includes blocking means temporarily actuated by the operator's response to hold the apparatus in the condition established by the response for a period sufficient for the apparatus to react and to prevent additional responses from being effected during that period. Means are also provided for permitting the operator to respond to a presentation before that presentation has been completed whereby, upon completion of the presentation, the apparatus will proceed into a further presentation of audio and visual information without interruption.

SUMMARY AND BACKGROUND OF THE INVENTION

This invention relates generally to educational devices and more particularly to audiovisual educational apparatus having a response mechanism which enables an operator to respond selectively to information presented aurally and visually.

In U.S. Pat. No. 3,483,633, issued Dec. 16, 1969 to A. E. Geils et al., there is illustrated and described an audiovisual educational apparatus in which visual images carried on a card-like image support are presented individually at a visual display station for visual presentation, the apparatus including a turntable on which a disc record is driven for the audible presentation of messages corresponding to the images. A response mechanism enables an operator to respond selectively to the audio and visual information presented, actuation of the response mechanism initiating a further presentation of audio and visual information. The response mechanism includes a series of response keys, one of which is depressed by the operator to indicate his response. However, the possibility exists that the response key will not be held in the depressed position long enough for the apparatus to react. Also, since it is intended that the operator proceed with an educational program or lesson represented by the images and messages at his own rate of speed, it is desirable that he be permitted to respond to any given presentation of audio and visual information before the completion of that presentation whereby the apparatus will proceed into the next presentation, corresponding to his response, without interruption.

Accordingly, the present invention provides blocking means for holding the apparatus in the condition established by the operator's response for a period sufficient to permit the apparatus to react, and for preventing the input of additional responses during that period. In a preferred embodiment, the invention also provides means which permit the operator to respond to a particular presentation of audio and visual information before the presentation has been completed and which cause the apparatus to proceed into the next presentation without interruption.

It is therefore a principal object of the present invention to provide an improved audiovisual educational apparatus.

Another object of the present invention is to ensure that the audiovisual educational apparatus will be held in the condition established by an operator's response for a period sufficient for the apparatus to react to that response.

It is a further object of the invention to provide means which permit the operator to respond to a particular presentation of audio and visual information before that presentation has been completed and which condition the apparatus for the next presentation of information without interruption.

Additional objects and advantages will be apparent from the following detailed description in conjunction with the drawings.

DESCRIPTION OF THE PREFERRED EMBODIMENT

Figure 1:
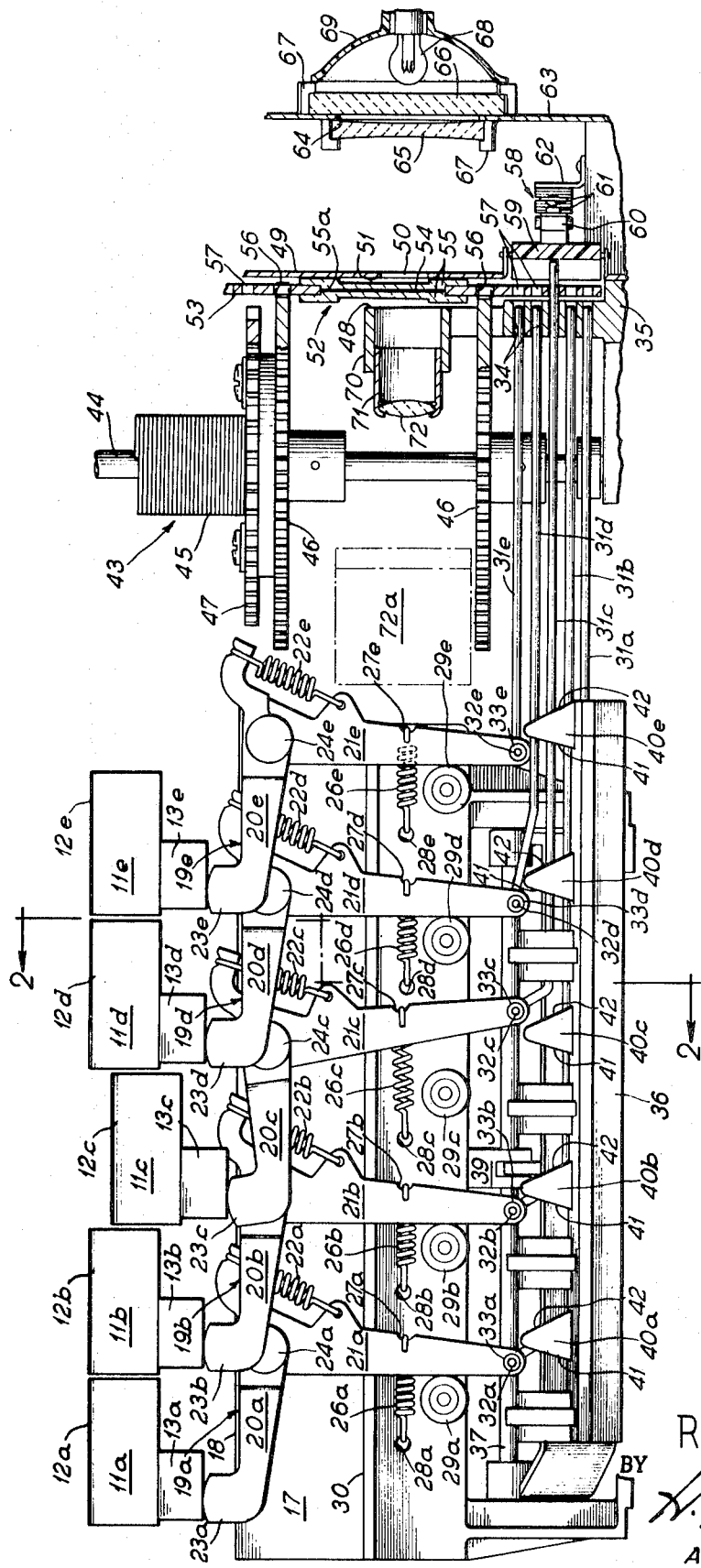
FIG. 1 is a front elevation view of a portion of an audiovisual educational apparatus.
Figure 2:
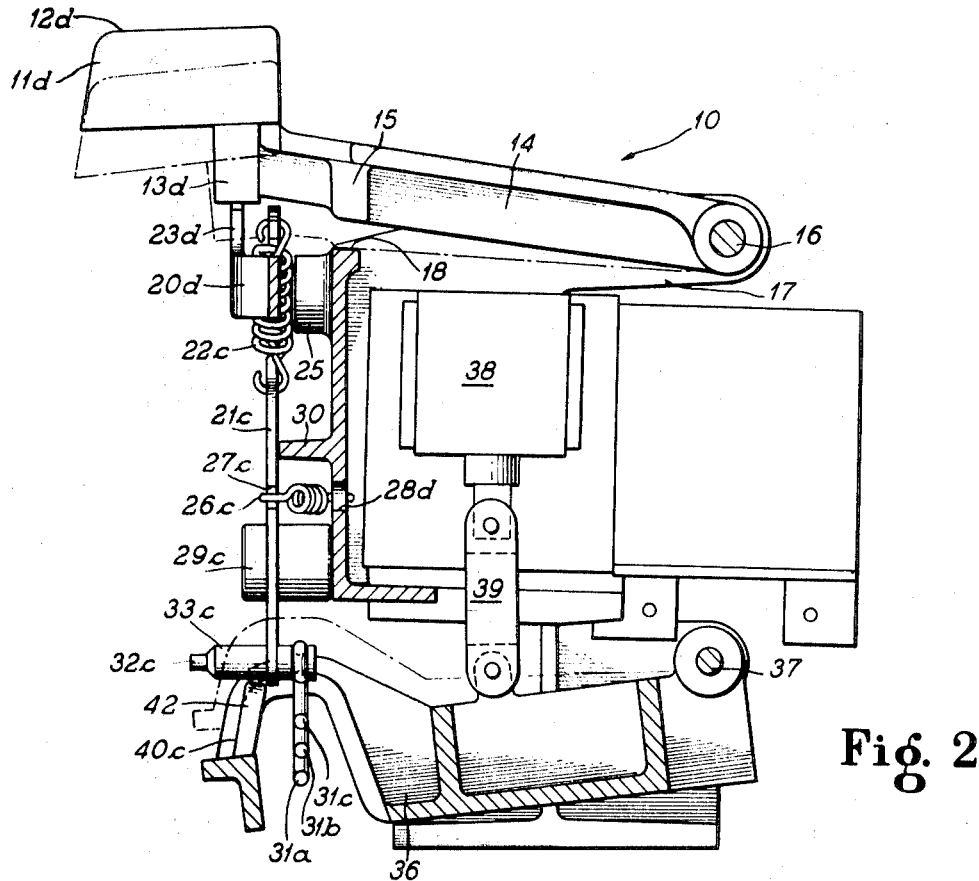
FIG. 2 is a view taken along the plane of line 2—2 of FIG. 1.

Referring to FIGS. 1 and 2 of the drawings, there is shown a responder mechanism, indicated generally at 10, which is adapted to be secured by any suitable means within a housing (not shown) of an audiovisual educational apparatus or teaching machine. Included in the responder mechanism is a plurality of response keys 11a, 11b, 11c, 11d and 11e on each of which is formed a surface 12a, 12b, 12c, 12d, 12e for manual engagement by the operator, the housing of the apparatus being constructed such that the surfaces 12a–12e are exposed for manual actuation of the response keys 11a–11e by the operator. The response keys 11a–11e are suitably positioned adjacent a viewing screen (not shown) carried by the housing. Each response key 11a–11e also includes an abutment 13a, 13b, 13c, 13d, 13e, a support arm and a stop, one of each of the latter being shown respectively at 14 and 15 in FIG. 2. Each of the support arms is journaled for pivotal movement at one end thereof about a shaft 16 mounted on a frame member 17 of the responder mechanism. The frame member 17 is formed with a stop surface 18 opposed to and adapted to be engaged by the stop 15 on each of the response keys 11a–11e, to limit counter-clockwise movement thereof as viewed in FIG. 2.

For each response key 11a–11e there is provided a bell-crank assembly 19a, 19b, 19c, 19d, 19e which includes a crank arm 20a, 20b, 20c, 20d, 20e, a lever arm 21a, 21b, 21c, 21d, 21e, and a tension spring 22a, 22b, 22c, 22d, 22e interconnecting the crank arm 20a–20e and the lever arm 21a–21e.

Each of the crank arms 20a–20e is formed with an upstanding finger 23a, 23b, 23c, 23d and 23e engaged by the abutment 13a–13e on the corresponding key 11a–11e. A pivot means, four of which are visible at 24a, 24c, 24d and 24e in FIG. 1, pivotally interconnects each of the crank arms 20a–20e with the corresponding lever arm 21a–21e and with a corresponding pivot projection, one of which is visible at 25 in FIG. 2, on the frame member 17. Stop means (not shown) are provided for limiting upward movement of the keys 11a–11e (or clockwise pivotal movement about the shaft 16 as viewed in FIG. 2). Accordingly, the tension spring 22a–22e and the abutment 13a–13e co-operate to maintain the crank arm 20a–20e and the lever arm 21a–21e in the relative angular relationship shown in FIG. 1.

A tension spring 26a, 26b, 26c, 26d, 26e is provided for each bellcrank assembly 19a–19e and has one end thereof engaged in a notch 27a, 27b, 27c, 27d, 27e formed in the coresponding lever arm 21a–21e and the other end thereof secured in an aperture 28a, 28b, 28c, 28d, 28e formed in the frame member 17. A stop 29a, 29b, 29c, 29d, 29e for each bellcrank assembly 19a–19e is formed of a resilient material and secured to the frame member 17 by any suitable means, thereby establishing a rest position for the corresponding lever arm 21a–21e. A guide projection 30 is formed on the frame member 17 to provide lateral support for the lever arms 21a–21e.

Pivotally connected to the lower end of each of the lever arms 21a–21e is an elongated control rod or pin 31a, 31b, 31c, 31d, 31e. As best shown in FIG. 2, the control pin 31a–31e may be pivotally connected to a pivot pin 32a, 32b, 32c, 32d, 32e carired by a resilient bearing member 33a, 33b, 33c, 33d, 33e which is fitted in a bearing opening (not shown) in the lower end of the lever arm 21a–21e. Alternatively, an end of the control pin 31a–31e can be bent at an angle to provide the pivot pin. The control pins 31a–31e are slidably supported in a series of bearing apertures 34 formed in a frame member 35 of the apparatus.

Positioned below the bellcrank assemblies 19a–19e is a blocking member 36 which is mounted for pivotal movement at one end thereof on a shaft 37 supported on the frame member 17. The blocking member has a lower rest position, as shown in FIG. 1 and in solid lines in FIG. 2, and an upper actuated position, as shown in dashed lines in FIG. 2, to which it is moved by a blocking solenoid 38 acting through a link 39, the solenoid 38 being supported in any suitable manner on the frame member 17. At the end of the blocking member 36 opposite the shaft 37 there is provided a series of generally triangular cam elements 40a, 40b, 40c, 40d, and 40e, each being positioned adjacent one of the bellcrank assemblies 19a–19e and having opposed cam surfaces 41 and 42.

Carried on the frame member 35 is a drive mechanism indicated generally at 43 and shown in part in FIG. 1. Included in the drive mechanism 43 is a rotatable shaft 44, a drive spring 45, sprocket wheels 46 and a ratchet wheel 47 secured to an upper one of the sprocket wheels 46 for rotation therewith. Secured to the frame member 35 by means not shown and spaced from a number of inner surfaces of the frame member, such as the surface 48, is a guide member 49 having a rectangular aperture 50 formed therein. The intersections of the walls of the aperture 50 with a planar surface 51 of the guide member 49 define a visual display station. The drive mechanism is shown in its entirety and described in detail in the co-pending patent application Ser. No. 26,382, filed Apr. 7, 1970 in the name of R. W. Roberts.

The planar surface 51 of the guide member 49 and inner surfaces of the frame member 35, such as the surface 48, define a channel or passage for an image support 52 which comprises a base plate 53, a film strip 54 positioned within a central aperture 55a in the base plate 53 and carrying two rows of images, and a pair of supporting strips 55 which are joined to each other, to the film strip and to the base plate by any suitable means (not shown) such as pins or rivets. The base plate 53 has two rows of sprocket holes 56 extending therethrough for engagement by the sprocket wheels 46, and two series of code apertures 57 arranged in rows outwardly of the sprocket holes 56, each row corresponding to one of the rows of images. Each code aperture 57 is either a round hole or a slot in accordance with the code devised for the program or lesson represented by the images.

Mounted on the frame member 35 is a response switch 58, shown in its closed position in FIG. 1, and including a switch actuator plate 59 mounted for pivotal movement about a vertical axis and aligned with the control rods 31a–31e and one of the series of code apertures 57. A resilient member 60 carries one of the switch contacts 61 and is secured to the frame member 35 by means (not shown) in a manner in which it is urged to a switch-open position. The resilient member 60 engages the switch actuator plate 59 to urge the latter toward a rest position and to be moved thereby to the switch-closed position, as will be described with greater particularly below. The other switch contact 61 is carried by a switch member 62 which is secured by any suitable means to the frame member 35.

Also carried on the frame member by any suitable means (not shown) is a lamp housing member 63 in which is formed an aperture 64 and which supports an optical element 65 and a transparent heat shield 66 by means such as the deformable mounting brackets 67 conveniently formed integrally with the lamp housing member 63. A lamp 68 and a reflector 69 are removably supported adjacent the heat shield 66 by any suitable means (not shown).

Formed on the frame member 35 is an optic support 70 in which is carried an optical mounting 71. In the latter there is fixed an optical element 72, the optical mounting 71 being movable relative to the optic support 70 for adjusting the sharpness of the visual presentation on the viewing screen (not shown). A mirror 72a is shown by dashed lines in FIG. 1 and forms a part of an optical system of the teaching machine.

Figure 3:
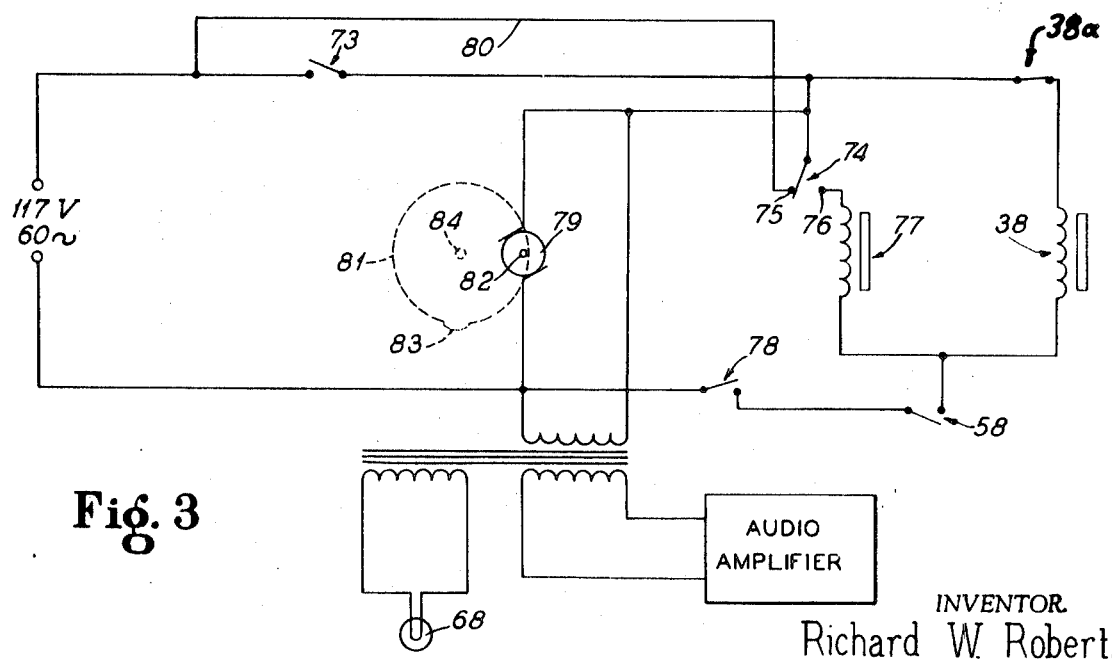
FIG. 3 is a schematic diagram of a control circuit for the audiovisual educational apparatus.

Turning now to FIG. 3, there is shown diagrammatically an electrical control circuit of the audiovisual educational apparatus or teaching machine, the circuit including the previously described blocking solenoid 38, response switch 58 and lamp 68. Also shown is a preferred 117 volt, 60 cycle power source, a blocking switch 38a, an on-off switch 73 which is manually actuable by the operator, a home switch 74 having poles 75 and 76, an advance solenoid 77 for actuating the drive mechanism 43, as will be explained hereinafter, a record sensing switch 78, a turntable motor 79 and a bypass line 80. A record turntable 81 is driven intermittently by the turntable motor 79 acting through a turntable drive mechanism indicated schematically at 82. The turntable 81 carries a switch-actuating lobe or cam 83 and is rotatably carried on an axle 84.

The home switch 74 is biased toward the pole 75 and is positioned to be engaged by the turntable cam 83 and urged thereby into engagement with the pole 76. Similarly, the blocking switch 38a is biased toward its closed position and is positioned to be engaged by the turntable cam 83 and urged thereby to its open position.

Turning now to the operation of the apparatus, the operator first closes the on-off switch 73, thereby energizing an audio amplifier shown schematically in FIG. 3, the lamp 68 and the turntable motor 79 which is adapted to rotate at a constant speed as long as the on-off switch 73 is closed.

The operator then inserts a disc record (not shown) in the audiovisual apparatus, the record sensing switch 78 being biased to its open position and positioned to be closed by the record when it is in position for operation on the turntable 81.

Each message recorded on the disc record is arranged to be presented within one revolution of the turntable as is described with greater particularity in the aforementioned U.S. Pat. No. 3,483,633.

The operator now inserts an image support 52 corresponding to the disc record, thereby storing energy in the drive spring 45. When the image support 52 has been inserted, a first image will be aligned with the aperture 50, whereby light from the lamp 68 will pass in sequence through the heat shield 66, the optical element 65, the supporting strip 55 nearest the lamp, the film strip 54, the supporting strip 55 furthest from the lamp, and the optical element 72, whence it is deflected by the mirror 72a and directed to the viewing screen (not shown) where the image is viewed by the operator. At this point the turntable 81 is in a home position in which the turntable cam 83 is engaged with the home switch 74 to hold it in engagement with the pole 76, the turntable drive mechanism 82 being inoperative, whereby the turntable 81 is motionless.

The apparatus is now in condition for the operator's first response, which is effected by depressing one of the response keys 11a–11e. For purposes of this description, it will be assumed that the operator has chosen response key 11c and has depressed the same by manually engaging the surface 12c. The response key 11c is thus moved to the position shown in FIG. 1, the abutment 13c exerting a downwardly directed force on the finger 23c to rotate the crank arm 20c in a counter-clockwise direction as viewed in FIG. 1 about the pivot means 24c, whereby the tension spring 22c exerts a force in a counter-clockwise direction on the lever arm 21c. The lever arm 21c is thus rotated in a counter-clockwise direction to the position shown in FIG. 1 against the tension of the spring 26c. This causes the control pin 31c to be slidably advanced in its bearing aperture 34, an end of the control pin 31c extending through a code aperture 57 and engaging the switch actuator plate 59 to urge the latter about its vertical pivotal axis to the right as viewed in FIG. 1. The switch actuator plate 59 urges the resilient member 60 to the right as viewed in FIG. 1 to close the response switch 58. When the response switch 58 is closed, the blocking solenoid 38 is energized to pivot the blocking member 36 about the shaft 37 to its actuated position as indicated in dashed lines in FIG. 2. The cam elements 40a–40e are thus raised, the cam surface 42 on the cam element 40c engaging the bearing member 33c to hold the bellcrank assembly 19c in its actuated position. At the same time the cam surfaces 41 on the cam elements 40a, 40b, 40d and 40e are opposed to the corresponding bearing members 33a, 33b, 33d, 33e respectively, to prevent the bellcrank assemblies 19a, 19b, 19d and 19e from being moved to their actuated positions. Should the operator attempt to effect additional responses at this time by depressing one or more of the keys 11a, 11b, 11c and 11e, the corresponding crank arm 23a, 23b, 23d, 23e will simply be pivoted about the pivot means 24a, 24b, 24d, 24e relative to the corresponding lever arm 21a, 21b, 21d, 21e against the tension of the spring 22a, 22b, 23d, 22e.

Bearing in mind that the home switch assembly 74 is still in engagement with the pole 76, the advance solenoid 77 is energized simultaneously with the blocking solenoid 38. The advance solenoid 77 actuates the drive mechanism 43 by retracting a pawl means, which is not shown herein but which is shown and described with particularity in the aforesaid co-pending application Ser. No. 26,382, from engagement with the ratchet wheel 47. The sprocket wheels 46, acting under the urging of the drive spring 45 and by virtue of their engagement with the sprocket holes 56 and the base plate 53, now exert a force tending to drive the image support 52 in a direction extending toward the observer from the plane of FIG. 1. If the code aperture 57 entered by the control pin 31c is a round hole (corresponding to an incorrect response), the image support 52 will be held against advancement by the control pin 31c. On the other hand, if the code aperture 57 entered by the control pin 31c is a slot, the image support 52 will be advanced through a distance corresponding to the length of the slot whereby a further image will be aligned with the aperture 50.

Simultaneously with the energization of the blocking solenoid 38 and the advance solenoid 77, the turntable drive mechanism 82 is actuated by means not shown to initiate rotation of the turntable 81, the input to the turntable drive mechanism 82 being provided by the turntable motor 79. A suitable turntable drive mechanism is shown and described with particularity in the co-pending application Ser. No. 26,380, filed Apr. 7, 1970.

Rotation of the turntable 81 drives the disc record to audibly present the message corresponding to the further image now aligned with the aperture 50. After approximately three degrees (3°) of rotation, the turntable cam 83 is moved out of engagement with the home switch 74, which is consequently urged into engagement with the pole 75. This de-energizes the advance solenoid 77 whereby the previously mentioned pawl means reengages the ratchet wheel 47 to hold the sprocket wheels 46 against movement.

At approximately 30° of rotation of the turntable 81, the audible presentation of a message (corresponding to the image now aligned with the aperture 50) commences. The synchronization of the images and messages is described in detail in the aforesaid U.S. Pat. No. 3,483,633. At approximately 55° of rotation of the turntable 81, the turntable cam 83 momentarily engages the blocking switch 38a to urge it to its open position. This de-energizes the blocking solenoid 38, whereby the blocking member 36 is returned to its rest position as shown in FIG. 1 and in solid lines in FIG. 2. The cam elements 40a–40e are consequently lowered, the cam surface 42 on the cam element 40c moving out of engagement with the bearing member 33c. The bellcrank assembly 19c is thus urged in a clockwise direction by the spring 26c until the lever 21c engages the stop 29c to return the bellcrank assembly 19c to its rest position, the finger 23c exerting an upward force on the abutment 13c to raise the response key 11c to its upper position.

Movement of the bellcrank assembly 19c to its rest position causes the control pin 31c to be moved to the left as viewed in FIG. 1 whereby it is disengaged from the switch actuator plate 59 and is withdrawn from the aperture 57 in the base plate 53 of the image support 52. Disengagement of the control pin 31c and the switch actuator plate 59 causes the latter to pivot to the left as viewed in FIG. 1 about its vertical axis under the urging of the resilient switch member 60, whereby the switch 58 is opened. The apparatus is now in condition to receive a further response from the operator, and if no such further response is forthcoming at this time the turntable will continue to rotate to through approximately 358°, at which point the turntable cam 83 will re-engage the home switch 74 to move it into engagement with the pole 76, the audible presentation of the message being completed at this juncture. If no further response has been effected, the turntable drive mechanism 82 will operate to stop the turntable and hold it in the home position as shown and described in the aforesaid application Ser. No. 26,380.

However, if at any time between approximately 55° and 360° of rotation of the turntable 81, the operator feels he has sufficient information to effect his next response, he may do so by again depressing one of the response keys 11a–11e. Such action will close the response switch 58 to energize the blocking solenoid 38, thereby holding the actuated bellcrank assembly 19a–19e in its actuated position and preventing actuation of the remaining bellcrank assemblies 19a–19e. Under these circumstances, when the turntable has been rotated through approximately 358° the turntable cam 83 will engage the home switch 74 to move it into engagement with the pole 76, thereby energizing the advance solenoid 77 which, in turn, will actuate the drive mechanism 43. If the further response is a correct one, the image support 52 will thus be advanced or, if the further response is an incorrect one, the image support 52 may be held in the same position. At the same time the turntable drive mechanism 82 will be conditioned to cause the turntable to continue rotation after 360° to provide the next audible presentation without interruption of the rotation of the turntable, the means by which this is accomplished being shown and described with particularity in the aforesaid co-pending application Ser. No. 26,380.

The bypass line 80 is provided to prevent the operator from interrupting the audible presentation by moving the on-off switch 73 to its open position during such presentation. More particularly, the bypass line causes the control circuit to remain energized until the turntable has rotated through approximately 358° at which point the turntable cam 83 will engage the home switch 74 to move it into engagement with the pole 76, whereupon, if the on-off switch 73 has been moved to its open position, the turntable motor 79, the lamp 68 and the audio amplifier will be de-energized.

While this invention has been described in connection with a certain specific embodiment thereof, it is to be understood that this is by way of illustration and not by way of limitation; and the scope of the appended claim should be construed as broadly as the prior art will permit.

What is claimed is:

1. In an audiovisual educational apparatus comprising means defining a visual display station, means for receiving a card-like image support having code means and carrying a plurality of visual images, means for effecting relative movement between said image support and said visual display station to present the images individually at said station for visual display, means for driving a turntable adapted to support an audio record means having a plurality of messages recorded thereon, each of said messages corresponding to one of said images, means for responding to audio and visual information presented and including a plurality of manually actuable response devices, each response device having a rest position and an actuated position, a plurality of control means each actuated by one of said response devices and adapted to co-act with said code means for controlling the relative movement between said image support and said visual display station, first actuator means energized in response to actuation of one of said control means for actuating said means for effecting relative movement, and means responsive to rotation of said turntable for de-energizing said first actuator means; the improvement comprising blocking means for holding an actuated one of said response devices in its actuated position and the others of said response devices in their rest positions, second actuator means energized in response to actuation of the control means corresponding to said actuated response device for actuating said blocking means, and means responsive to further rotation of said turntable for de-energizing said second actuator means after said first actuator means has been de-energized to return said one response device to its rest position.

References Cited
UNITED STATES PATENTS

| | | | |
|---|---|---|---|
| 3,112,569 | 12/1963 | Moore et al. | 35—5 |
| 3,264,757 | 8/1966 | Kobler | 35—5 |
| 3,483,633 | 12/1969 | Geils et al. | 35—9 R |

WILLIAM H. GRIEB, Primary Examiner

U.S. Cl. X.R.

35—5